Figure 1:
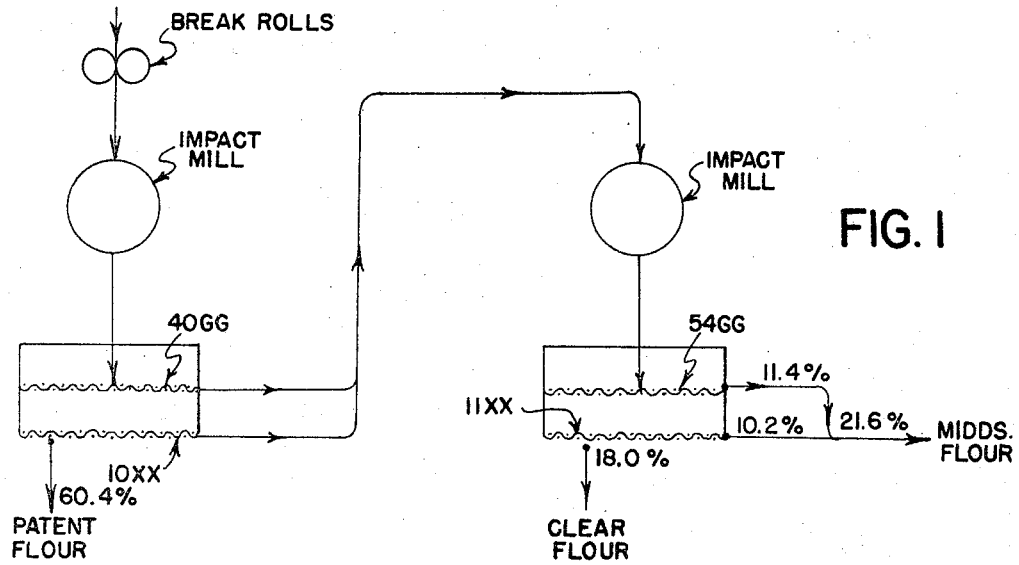

INVENTOR.
LAVERNE M. ODDEN
BY Robert B. Hughes
ATTORNEY 3,430,869
MILLING PROCESS FOR RYE
La Verne M. Odden, Wayzata, Minn., assignor to General
  Mills, Inc., a corporation of Delaware
Filed Mar. 23, 1965, Ser. No. 442,097
U.S. Cl. 241—9                                     5 Claims
Int. Cl. B02c 9/04, 11/04, 11/08

This invention relates to a new and improved short flow process for milling rye.

In modern milling history, it has been customary to mill various types of grain by utilizing what is known as a "gradual reduction" milling process in which the grain is passed successively through a series of breaking operations. The flour stock is sifted out at various stages of the operation to obtain the different classes of product, which can, if desired, be recombined in such proportions to obtain the precise types or grades of flour desired as the end products.

Simply examining the flow charts of typical commercial flour milling operations discloses the somewhat complex nature of this gradual reduction method. The exact processes vary, depending upon the type of grain being used and the specific end product desired, etc., but generally the grain is passed through a first set of rolls (this being the first break), and the resulting stock is classified according to size, as for example, into overs or scalps, sizings, first midds, second midds and fines. The fines are collected either as patent or clear flour, and the other above-named classes of flour stock are each passed through a respective set of several more sets of rolls to cause further reductions, after which there is further classification. Some of this stock is taken out as patent or clear flour, and the rest is subjected to yet further reduction through other rolls and then subjected to yet further classification. Quite naturally, the arrangement by which the various portions of flour stock are extracted from various stages of the gradual reduction milling process has served as a basis for identifying certain classes of flour product, and thus we have become accustomed to terms such as "patent flour, first clear, second clear, etc."

As would be expected in an art as old as flour milling, the approaches have been many and varied to improve the various phases of the milling process (i.e., the tempering, breaking, classifying, bleaching, etc.), and the patent literature alone suggests the abundance of creative effort that has been directed toward improving the same. One of the results has been that the art of flour milling has reached a stage of refinement or development where not only the efficiency of output (i.e., percentage of extraction of the flour product from the berry) and the quality thereof are at a high level, but it is possible to produce with greater consistency types of grades of flour better adapted for specific uses. As might be expected, this has in turn led to greater degree of sophistication in the commercial food processes in which flour is used. That is to say, the realization of the food manufacturers that they can expect to receive with a relatively high consistency, flour of a certain predetermined quality (which means a flour having more predictable characteristics), has enabled (and to some extent induced) the various food manufacturers to produce various food products which in turn require a high quality flour of certain specified characteristics.

This sequence of developments has in a sense made further improvements in the flour milling art more difficult. If a possible improvement is such that a high percentage of flour extraction is not maintained, it is, in view of the highly competitive nature of the industry, commercially impractical. Also an improvement of one aspect of the flour cannot be at the expense of some other quality. (For example, if the type of flour produced by some new process is such that a loaf of bread made therefrom has a higher volume, the flour would still not be acceptable if the cell structure, color or some other quality of the bread is in some way less than wholly desirable.) Then there is the further consideration that the character of the classes of flour extracted must be such as to conform generally to the types which conventional food processing operations (e.g., a commercial bakery) are accustomed to use, so that food products made therefrom are of a predictable quality (regardless of whether or not the flour has certain characteristics which may be regarded as "superior").

As indicated previously the present invention is directed to the milling of rye, and it may be stated as a general object of this invention to provide an improved short flow milling process for rye.

Conventionally, rye is milled in a manner to give a high yield of patent flour (about 60% by weight of the total product) and a clear flour, with the rest of the rye being collected as midds. In the preferred embodiment of the present invention, the milling conditions are such as to yield classes of flour corresponding to those obtained by present conventional milling processes. Indeed it is one of the advantages of the present invention that it is possible to produce the types of flour product to which the industry is accustomed, and for which, therefore, there are readily available markets, and to produce the same in percentages of yield comparable to conventional flour milling procedures.

Thus it may be stated as a more specific object to provide such a short flow milling process in which the yield and quality of flour can be made to be at least comparable in quality and output to that produced by prior art methods, while accomplishing the same in a simplified manner, this resulting in advantages such as savings in plant space and equipment, upkeep and maintenance, ease of operation, etc.

It is a further particular object that in the process of the present invention the tempering of the grain can be accomplished more conveniently in a shorter length of time, in comparison with milling processes now generally in use.

Figure 2:
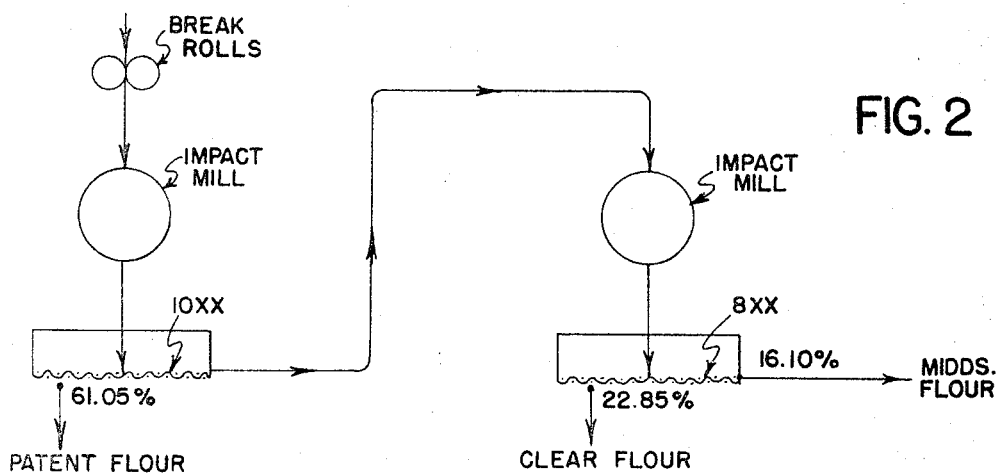
Figure 3:
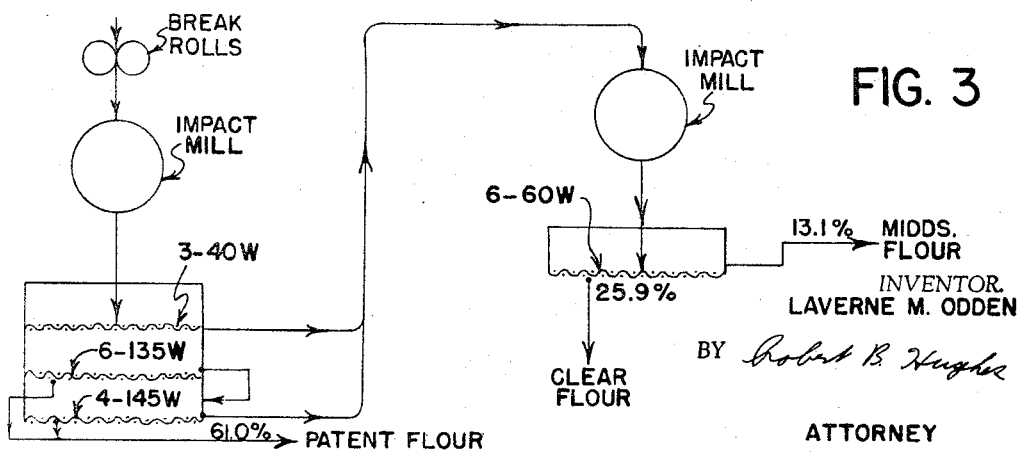
Figure 4:
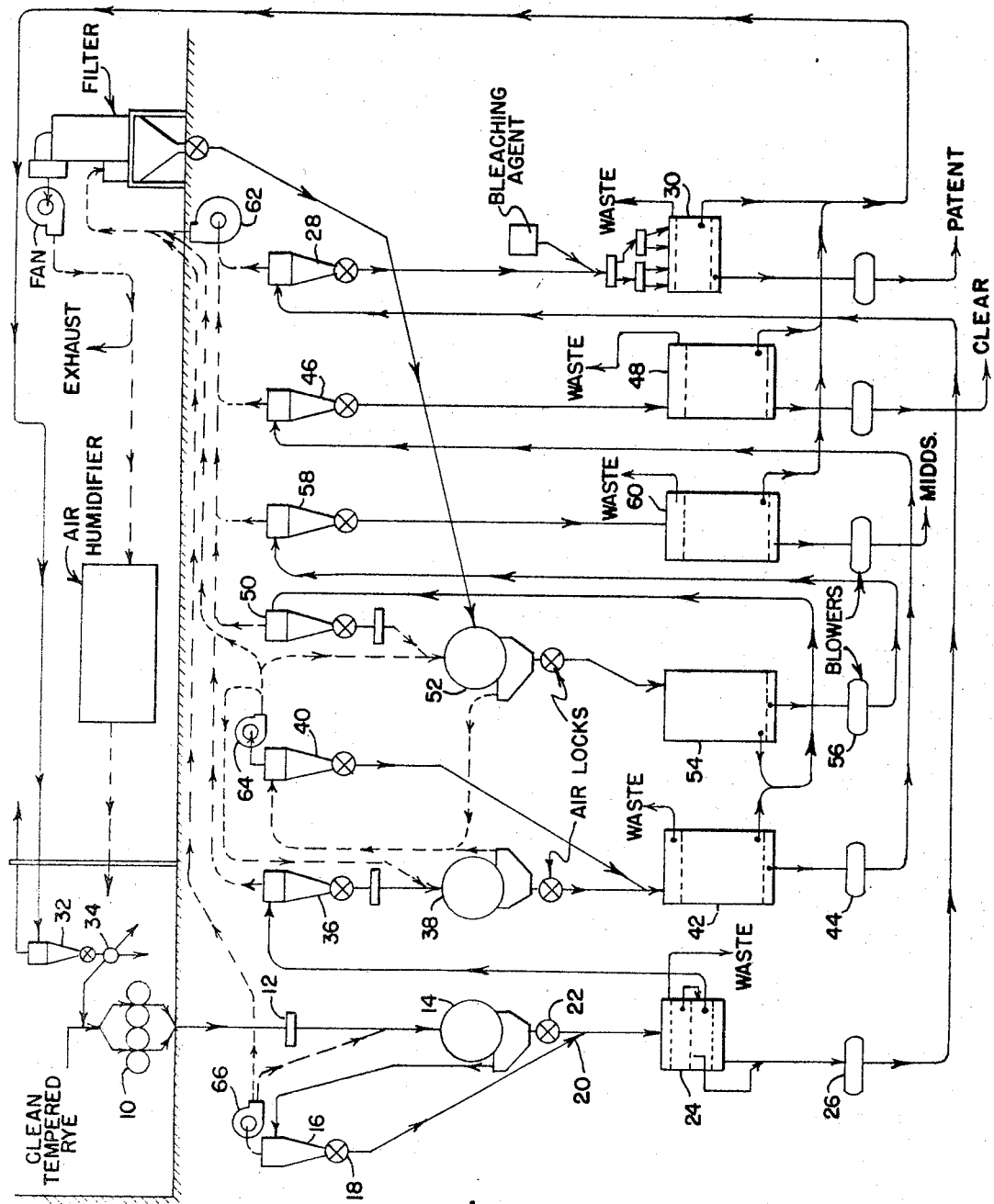

These and other objects and features of the invention will be more readily understood and appreciated from the following detailed description of the preferred embodiments thereof selected for purposes of illustration and shown in the accompanying drawings, in which:

FIGURES 1–3 are each a schematic drawing disclosing a respective simplified embodiment of the present invention, and FIGURE 4 is a schematic drawing disclosing the flow of a fourth and more detailed embodiment especially adapted for a full scale commercial operation.

As indicated previously, the four particular embodiments disclosed herein are designed to produce flour products corresponding in quantity and quality rather closely to those which most rye milling operations now produce. It is understood, of course, that the precise arrangement and operation of a flour mill is an empirical sort of thing; and changes in the number and sizes of sieves used at various stages, the hardness of the breaks, certain modification in the flow, etc., can be made to achieve certain results. For those people having long experience in milling, the control of the milling process becomes a rather refined art, and these experienced millers are able to make certain changes or combinations of changes to modify the output of the mill in the way desired. Accordingly, it is believed that the present invention can be described most clearly to those skilled in the art by disclosing the details of the process in terms of producing flour products corresponding rather closely to conventional rye milled products, with the realization that those skilled in the milling art can make the adjustments or modifications required to obtain desired variations in the end products.

The present invention can be described generally as follows: The rye grains are subjected to a grinding break (by being passed through breaking rolls) in a manner to subject the grains to a very "hard" break, and the resulting product is impact milled. To obtain a rye patent flour corresponding to that achieved in conventional milling processes, the product from the impact mill is sifted to separate out the more coarse branny fraction with the throughs being the patent flour. To produce a clear flour, the overs of the aforementioned sifting step (i.e., the more coarse branny fraction) is passed through an impact mill and sifted, with the throughs being the clear flour. The overs from this second sifting are disposed of as rye midds and can, if desired, be further processed, as by being passed through an impact mill and sifted.

As indicated previously, rye is utilized in the present invention. The rye is first cleaned and tempered. The tempering can be done in the usual manner by adding a certain amount of water to the rye and permitting the rye to stand in a closed environment for a period of time. However, as indicated previously, in the present invention, the tempering can be, and desirably is, accomplished in a short period of time in comparison with the tempering required in conventional gradual reduction milling methods, and hence in the present invention a tempering period of about 1 to 3 hours has been found to be suitable.

The cleaned and tempered rye is subjected to a severe grinding break (i.e., a grinding break being one which subjects the rye to both a crushing and a shearing action) by passing the rye one or more times through breaking rolls rotating at different peripheral speeds. The severity or hardness of the break is often conveniently determined in the flour milling industry by ascertaining the percentage of the product of the break which passes through a sieve of a predetermined size. The precise degree of severity of the break to which the rye is subjected will depend somewhat upon the character of the rye being milled, and upon the quality of flour desired as the end product. In present day conventional milling operations, it is usually desired to extract about 60% of the rye as patent flour (the total weight of rye before being milled being considered 100%). To achieve this approximate 60% extraction of patent flour in the present invention, this break should be sufficiently hard that about 50% of the product of the break passes through a 28W screen. With the break somewhat less hard (e.g., with about 45% passing through the 28W screen after this first break), the yield of patent flour begins to fall off to an undesired extent. The upper limit of the severity of the break is limited primarily by the practical considerations of the milling operation. For example, the equipment should not be over-stressed by making the break excessively severe, and also with the break too severe, the bran particles tend to break up to a degree somewhat more than desired, and thus have more tendency to pass into the end flour products. Thus it can be seen that there is no particular advantage in making the break excessively severe.

Conventional breaking rolls can be used for this break, such as those having diameters of perhaps 7 inches, 9 inches, or 10 inches, and with the corrugations on the surfaces of the rolls being perhaps 16 or 20 corrugations per inch. As is conventionally done in the milling art, one of the rolls in a set of breaking rolls is rotated at a faster speed than the other, speed ratios of about two and a half to one being found quite desirable. This speed ratio, can, of course, be varied (this being well known in the art).

The product from this hard break is put through an impact mill to cause a further reduction of the product and to separate the endosperm from the bran. There are of course, many types of impact mills, and an impact mill which has been found suitable for this purpose is a pin mill of the type produced by Alpine Company, of the Kolloplex type. In this mill, there are two circular, parallel plates which face one another, and each plate has several concentric circular rows of pins extending towards the other plate, with the rows of pins on one plate reaching between a proximate pair of rows on the other plate. One plate is fixed while the other plate rotates so that each proximate pair of rows of pins (one row from each plate) moves with respect to the other. The material to be milled is fed into the center of the mill at a location between the two plates, and as it flows outwardly to the periphery of the plates, it is subjected to a plurality of impacts against the pins, after which it passes out an exit opening of the mill. Quite good results have been obtained when the mill is operated at a speed so that the outermost set of pins has a peripheral speed of about 400 to 450 feet per second. At speeds of about 300 feet per second, the yield of the patent flour produced begins to fall off somewhat in general to achieve a good quality and good yield of patent flour it may be said that the product should be impacted with a relatively high velocity and subjected to enough impaction to separate most of the endosperm from the bran. As indicated previously, this will depend upon the precise character of the end product desired.

The product from the impact mill is then sifted to remove the more coarse branny fraction, with the throughs being taken off as patent flour. A 10XX screen is approximately the right size to separate out the coarse branny fraction, and while a single 10XX screen could be used (as shown in FIG. 2), it is generally a better practice (as shown in FIGS. 1 and 3) to first separate out a rather coarse fraction before passing the rest of the product over a 10XX screen. Thus, in FIG. 1, the product is passed through 40GG screen with the throughs going to the 10XX screen, and in FIG. 3 the product is passed over three 40W screens, with the throughs being passed over six 135W screens, and the overs of the 135W screens are passed over four 145W screens, with the throughs of both 135W and 145W screens being the patent flour.

This patent flour has a certain amount of bran in it, as does the patent flour produced by conventional rye milling processes. If it were desired to produce a cleaner patent flour, the product from the breaking rolls could be sifted to remove a coarse branny fraction, with the remainder passing into the impact mill and then, if desired, the product from the impact mill can be further classified to leave the patent flour.

The branny fraction is extracted to leave the patent flour (this branny fraction normally being extracted after the impact milling) is then subjected to a second impact milling in a manner similar to the first impact milling step. The product from this second impact milling is then classified, with the throughs being a clear flour. The degree of classification will depend upon the amount and quality of clear flour extracted. Thus in FIGS. 1, 2 and 3, respectively, an 11XX screen, an 8XX screen, and a number of 60W screens were used to obtain the desired yield of clear flour.

The scalp of this second sifting step is then taken off as midds. These rye midds can be sold as a commercial product (e.g., for feed) without further processing, but for some types of rye bread it is desirable to add this midds fraction back into the flour. If this is to be done, these midds are subjected to yet further impact milling to reduce the same to the desired particle size.

FIG. 4 is a flow diagram of an embodiment of the present invention adapted for a full scale commercial operation, wherein the product is pneumatically conveyed through the mill. The clean tempered rye is passed through a set of breaking rolls 10 to subject the rye to a severe break, as indicated previously herein. (To obtain a higher capacity in the mill, two sets of rolls 10 are provided, with the rye being split into two streams, each of which is fed through a respective set of rolls.) The broken rye product then passes through a magnet 12 to remove any metallic particles therein, and then passes into a Kolloplex impact mill, such as the one indicated previously herein.

In the normal operation of this particular type of mill, a relative high volume of air flows through the mill along generally the same path as the product being milled. Since some of the fines tend to be caught up in this air stream passing through the mill, the exhaust from the mill is directed to a cyclone separator 16 which takes out the fines which pass through an airlock 18 and back to the main stream of the product from the impact mill 14.

The product from the mill 14 passes through an airlock 22 and is classified by being passed through a set of screen 24, the sizes of which are 10W, 135W and 145W, in generally the manner indicated in FIG. 3. However, whatever is retained on the 10W screen is usually foreign matter which is disposed of as waste. The throughs from this set of screens 24 passes to a patent scale 26 from which it is conveyed pneumatically to a cyclone separator 28. The product from this cyclone separator 28 passes through a rebolt sifter 30, and the throughs are taken off as patent flour. A bleaching agent can be added at a suitable location, as indicated in FIG. 4. Whatever scalp there is from the rebolt sifter is conveyed pneumatically back to a cyclone separator 32, from which the product can be directed by means of a 3-way valve 34 to one of three desired locations, to be indicated hereinafter.

The scalp of the several screens of the classifying unit 24 are conveyed to another cyclone separator 36, with the product taken therefrom passing into a second Kolloplex impact mill 38. The air passing through this mill 38 is recycled by means of the cyclone separator 40, in much the same manner as is the air from the impact mill 14, and the fines so extracted are fed back into the product stream from the impact mill 38. The product from this mill 38 is directed to a classifying unit 42 which comprises one or more 10W screens and a plurality of 60W screens. The throughs of the 60W screen pass to a clear scale 44 and are conveyed pneumatically through a cyclone separator 46 to a rebolt sifter 48, with the throughs from the rebolt sifter 48 being taken out as clear flour. As with the rebolt sifter 30, whatever scalp is taken from the rebolt sifter 48 is conveyed pneumatically to the aforementioned cyclone separator 32.

The scalp of the classifying unit 42 is carried to a cyclone separator 50 from which the product is fed to a third Kolloplex impact mill 52. The product from the impact mill 52 is fed to a classifying unit 54 containing a plurality of 40W screens. The throughs from this unit 54 are directed through a midds scale 56, conveyed to a cyclone separator 58 and then through a rebolt sifter 60. The throughs from the rebolt sifter 60 are taken away as rye midds, while any scalp therefrom is conveyed (in the same manner as the scalp from the other rebolt sifters 48 and 30) to the aforementioned cyclone separator 32. The scalp from this third classifying unit is directed (along with the scalp from the second classifying unit 42) back to the cyclone separator 50 and into the impact mill 52. Thus any coarse particles from this fraction is constantly recycled until they are reduced in size to pass the 40W screen.

Fans 62, 64 and 66 draw air from the various cyclone separators and feed them through a filter, while another fan 68 draws air from the filter either to an exhaust or through an air humidifier to be fed back into the conveying system. The air humidifier, as its name implies, functions to keep the humidity of the air in a system at the desired level.

In a summary of the embodiment of FIG. 4, the clean and tempered rye is first passed through the rolls 10. As explained previously in some detail, this break should be quite severe. The product from the break passes through the mill 14, and the product from this mill 14 is sifted to obtain a patent flour, while the coarse fraction is passed through a second mill 38 and sifted to obtain a clear flour. The overs from this second sifting (which takes place at the classifying unit 42) are fed through a third impact mill 52, the product from which is sifted to obtain a midds fraction. In this particular embodiment, the overs from this midds sifting step (this taking place at 54 in FIG. 4) is recycled back through the impact mill 52. Thus there is no coarse fraction remaining, since the overs of the classifying unit 54 are simply fed back through the mill 52 along with the overs from the classifying unit 42 until all the product is reduced to the desired size, i.e. as fine rye midds.

In the normal operation of this mill, there will be very little, if any, scalp taken from the rebolt sifters 30, 48 and 60. However, if one of these rebolt sifters should begin collecting scalp, this scalp (collected by the cyclone separator 32) can be directed by means of the 3-way valve 34 either to the initial stream of rye, or to the impact mill 38 or to the impact mill 52.

The present invention will be disclosed with further particularity in the following examples:

*Example I*

Rye grain was tempered for two hours at 14.5% moisture, and then was passed through a pair of Allis rolls, counter-rotated at a differential speed of a ratio of 2½:1. These rolls were operated in such a manner that the rye grain was subjected to a hard break as specified earlier herein. The product from the rolls was passed through a Kolloplex pin mill, Model No. 160Z, which was rotating at a speed of 19,000 r.p.m., and the product from this mill was processed as indicated in the flow diagram of FIG. 1, with the percentages of extraction being shown in FIG. 1.

The patent flour produced was baked into bread, which was found to be superior in volume and color in comparison to that from a rye patent flour that was made according to conventional methods in a commercial rye mill.

*Example II*

The same process was followed as in Example I, except that a degermed rye was used, and the classifying was done according to the screens indicated in FIG. 2. The yield of patent flour was 61.05% based upon total weight of the initial rye product. This patent flour was subjected to a bake test and was rated good to good-minus in the bakes. The percentages of yield are indicated in FIG. 2.

*Example III*

The same process was followed as in Example I, except that the product was processed according to the screens indicated in FIG. 3. Also, a Kolloplex mill, Model No. 400Y was used instead of the Model No. 160Z used in Examples I and II. The yields are indicated in FIG. 3.

The patent flour produced was subjected to a bake test, and was found to be equal to a rye flour produced by a conventional commercial rye mill.

It should be understood that the foregoing is merely illustrative of a certain embodiment of the invention and many variations may be made by those skilled in the art without departing from the spirit and scope of the invention.

Now therefore I claim:
1. A short flow process for milling rye, comprising:
   (a) subjecting said rye to a hard grinding break, such that at least about 45% of the resulting product is able to pass through a 28W screen,
   (b) then impacting said product at a relatively high velocity so as to further reduce the product and loosen most of the endosperm particles thereof from the bran, thereby providing a fine fraction of rye patent flour in an amount substantially corresponding to that obtainable from the same rye by a gradual reduction milling process, and
   (c) classifying said product to separate the fine fraction of patent flour.
2. The process as described in claim 1, wherein there is a remaining fraction from said classifying step which remaining fraction is further impacted to form a resulting product which is further classified to separate out a second fine flour fraction as clear flour.

3. The process as recited in claim 2, wherein there is a coarse fraction taken out from the further classifying step recited in claim 2, which coarse fraction is taken out for rye midds.

4. The process as recited in claim 3, wherein said rye midds are subjected to yet further impacting to obtain a fine rye midds.

5. A short flow process for milling rye, comprising:
 (a) subjecting said rye to a hard grinding break such that at least about 50% of the resulting product is able to pass through a 28W screen,
 (b) then impacting said product at a relatively high impact velocity essentially equal to that obtained in a rotating pin mill having a peripheral pin speed of at least about 400 feet per second so as to further reduce the product and loosen most of the endosperm particles thereof from the bran, thereby reducing about 60% (by weight) of the total rye to rye patent flour, and
 (c) classifying said product in a manner to separate out the fine patent flour fraction which is such as to be able to pass through a screen of approximately the size of a 10XX screen.

References Cited

UNITED STATES PATENTS

| | | | |
|---|---|---|---|
| 1,784,762 | 12/1930 | Smith | 241—11 |
| 1,980,622 | 11/1934 | Johnson | 241—10 |
| 2,283,571 | 5/1942 | Perrigo | 241—11 |
| 2,847,167 | 8/1958 | Szasz | 241—10 |
| 2,879,004 | 3/1959 | Dodds | 241—10 |
| 2,464,212 | 3/1949 | Carter | 241—19 |
| 3,226,041 | 12/1965 | Graumann | 241—9 |

FOREIGN PATENTS

| | | |
|---|---|---|
| 674,263 | 4/1929 | France. |
| 1,033,764 | 7/1953 | France. |

OTHER REFERENCES

Kaiser, "Impact Milling," American Miller and Processor, August 1960, pp. 14–16, 36 and 37.

ANDREW R. JUHASZ, *Primary Examiner.*

U.S. Cl. X.R.

241—19